UNITED STATES PATENT OFFICE.

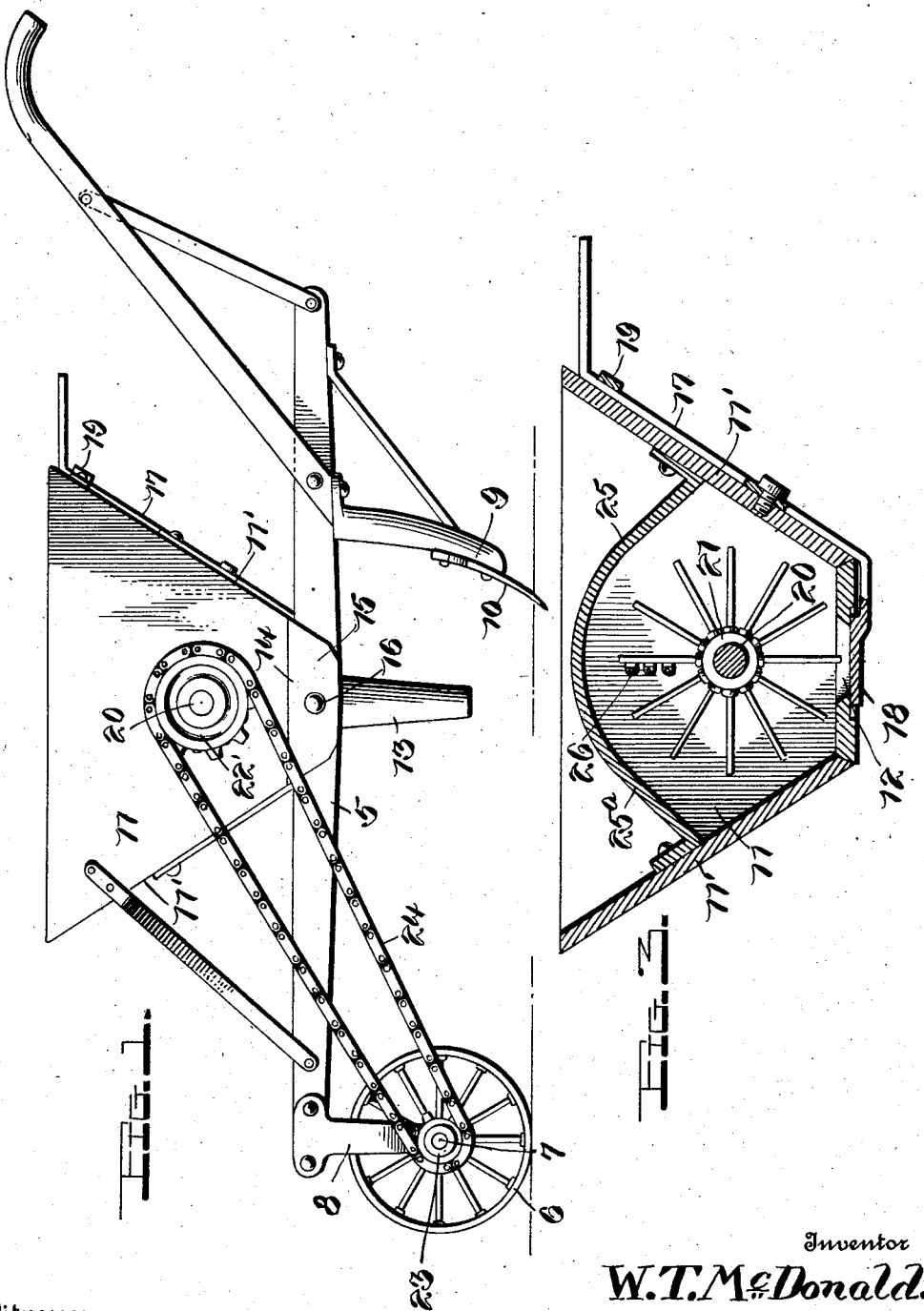

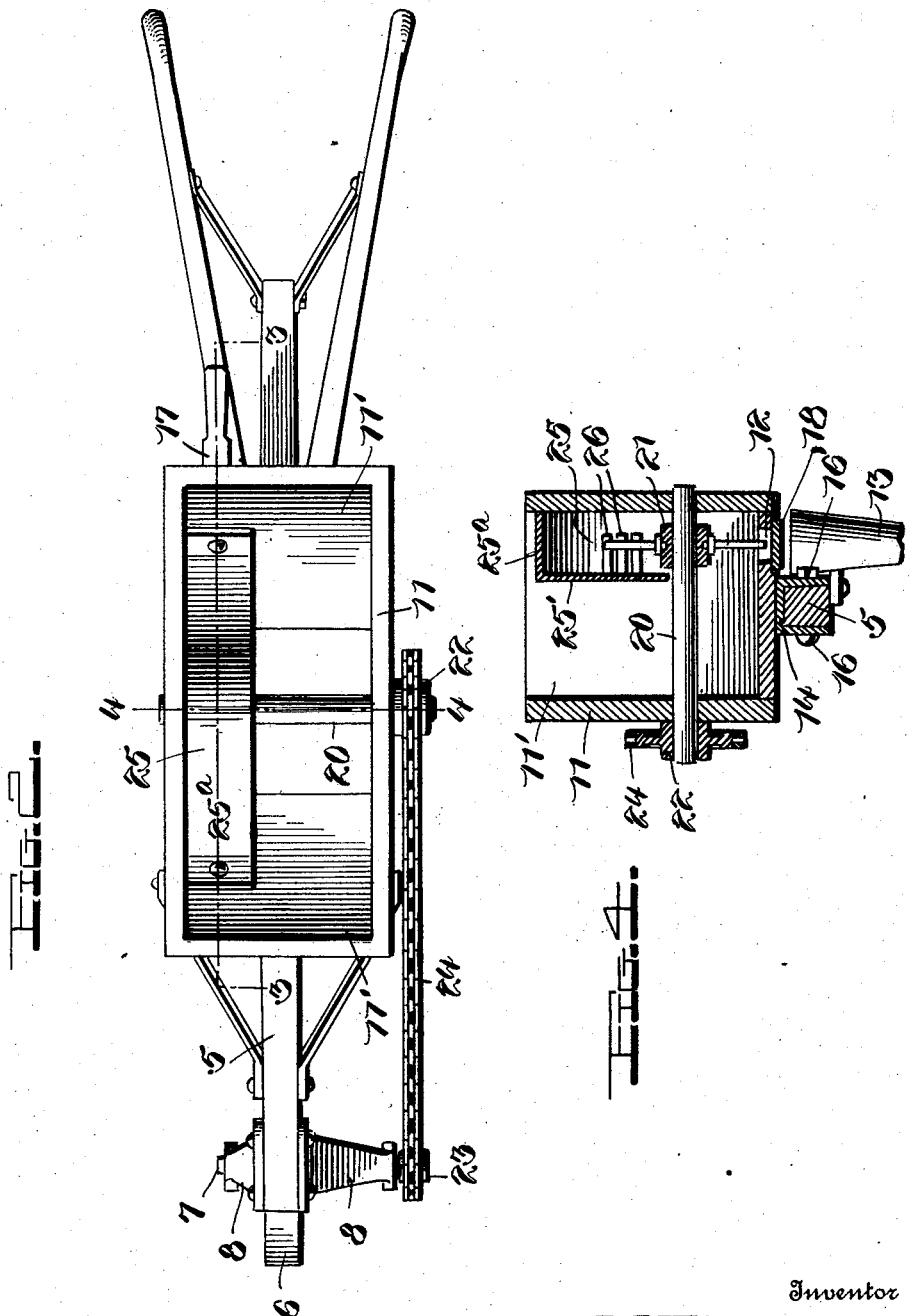

WILLIAM T. McDONALD, OF PORTERDALE, GEORGIA.

FERTILIZER-DISTRIBUTER.

997,401.  Specification of Letters Patent.  Patented July 11, 1911.

Application filed December 14, 1910. Serial No. 597,247.

*To all whom it may concern:*

Be it known that I, WILLIAM T. McDONALD, a citizen of the United States, residing at Porterdale, in the county of Newton and State of Georgia, have invented certain new and useful Improvements in Fertilizer-Distributers, of which the following is a specification, reference being had to the accompanying drawings.

This invention relates to improvements in fertilizer distributers and more particularly to a distributer of that character which is adapted to be arranged upon the plow beam of a cultivator to deposit the fertilizing material about the roots of the plants in advance of the cultivator blade.

The main object of the invention resides in the provision of improved means for agitating the fertilizing material to prevent the same from sticking when in a damp state, thereby insuring the positive feed of the material.

A further object of the invention is to simplify and improve the construction of machines of this character without materially increasing the cost of production and to render the same highly efficient and durable in practical use.

With the above and other objects in view, the invention consists of the novel features of construction, combination and arrangement of parts hereinafter fully described and claimed, and illustrated in the accompanying drawings, in which—

Figure 1 is a side elevation of a combination fertilizer distributer and cultivator embodying my improvements; Fig. 2 is a top plan view; Fig. 3 is a section taken on the line 3—3 of Fig. 2; and Fig. 4 is a section taken on the line 4—4 of Fig. 2.

Referring in detail to the drawings 5 designates a wheel supported beam, the supporting wheel 6 being mounted upon a shaft 7 journaled in the ends of the hanger bars 8 which are rigidly secured to the forward end of the beam 5. To the other end of the beam 5 the cultivator foot 9 is secured, the cultivator blade 10 being adapted to enter beneath the surface of the soil and to discharge the soil at the roots of the plants.

It is the purpose of the present invention to dispose the fertilizing material at the roots of the plants in advance of the cultivator blade so that the earth is turned over upon the material and the same retained at the place deposited so that the plants will receive the full benefit of the nutriment to be derived therefrom.

To the above end, I mount upon the beam 5 above the cultivator foot, a receptacle or container 11 into which guano or other fertilizing material is poured. In the bottom of the receptacle and at one side thereof a discharge opening 12 is provided and a spout or chute 13 is fixed to the bottom of the receptacle beneath this opening and may be inclined forwardly and downwardly therefrom so that its lower end is positioned in advance of the cultivator blade. The fertilizer receptacle has secured thereto an attaching member 14 which consists of a plate bent intermediate of its ends to provide the U-shaped portion 15, the parallel sides of such U-shaped portion being disposed upon the opposite sides of the beam 5. A bolt 16 extends through the beam engaging portions 15 of this plate, and is positioned beneath said beam. Upon one end of this bolt a nut 16' is threaded whereby the receptacle may be rigidly held upon the beam. The end portions of the plate 14 are disposed upon the inclined end walls 11' of the receptacle 11 and are suitably secured thereto. A lever 17 is pivoted upon one end of the receptacle 11 and at its lower end extends beneath the same. This end of the lever is provided with a plate 18 which is movable beneath the opening 12 in the bottom of the receptacle whereby said opening may be closed and flow of the material into the depositing chute 13 interrupted. The upper end of the lever 17 is movable in a guide 19 which also limits the movement of the plate 18 on the lower end of said lever.

In order to effectually overcome all liability of the fertilizer material packing or sticking together so that the proper feed thereof is interfered with, I provide the agitating means which comprises a shaft 20 journaled in the opposite sides of the receptacle or container 11. An agitating element 21 is fixed upon this shaft within the receptacle and upon one end of the shaft exteriorly of the receptacle a sprocket wheel 22 is secured. The wheel shaft 7 is extended at one end and upon such extended portion a sprocket 23 is fixed. An endless chain 24 connects the sprockets 22 and 23 whereby power is transmitted from the ground engaging wheel to the agitator shaft. A guard 25 is arranged over the agitating element 21 within the receptacle, the ends of said guard being secured to the ends of the receptacle. This guard consists of a single piece of sheet metal bent to provide a side 25' and the flange 25ᵃ which forms the top of the guard, the edge of said flange engaging closely upon the side of the receptacle 11. To the side 25' of the guard, a plurality of flexible fingers 26 are secured, said fingers being disposed in the path of movement of the agitating element 21.

In the operation of the machine, as the same is moved over the ground between the plant rows, the cultivator blade engages the soil close to the roots of the plants and turns the soil over upon the roots. The fertilizing material has previously been deposited upon the plant roots so that the soil which is disturbed by the cultivator blade covers the same and retains it in place. It will, however, be obvious that in certain uses which require the fertilizer to be deposited after the soil has been distributed, the spout or chute 13 may be removed and another of different form arranged in its place so that it extends behind instead of in advance of the cultivator blade. The guard 25 prevents the fertilizing material from flying out of the receptacle in the movement of the agitating element and when the material has become damp, the engagement of the resilient fingers arranged on the guard, with the agitator will effectually separate or disintegrate the caked particles of the material so that a positive feed of the same is assured at all times. The flow of the material may, however, be instantly cut off by shifting the lever 17 to move the plate 18 beneath the discharge opening in the bottom of the receptacle 11.

From the foregoing it is believed that the construction and operation of my improved fertilizer will be readily understood.

The machine is comparatively simple in its construction, highly efficient and durable in operation and provides means for depositing the fertilizer properly so that the plants being cultivated receive the greatest possible benefit therefrom.

While I have shown and described the preferred construction and operation of my improved machine, it will be understood that the same is susceptible of considerable modification without departing from the essential feature or sacrificing any of the advantages thereof.

Having thus described the invention what is claimed is:—

The combination with a receptacle including a wheel supported beam and a cultivator foot fixed to said beam having a shovel secured thereto, of a receptacle mounted upon said beam, a shaft journaled in the opposite sides of the receptacle, power transmission means between said shaft and the wheel axle, a plurality of radially extending agitating members fixed to said shaft within the receptacle, said receptacle having a discharge opening in its bottom, a curved guard plate arranged in the receptacle and disposed over the agitating members on said shaft, the ends of said guard plate being rigidly fixed to the ends of the receptacle, said guard plate having a vertical wall spaced from the side of the receptacle, a plurality of spring fingers fixed at one of their ends to the side wall of the guard plate and extending at right angles to the agitating members on the shaft, the ends of said fingers being disposed in the path of movement of said agitating members, a depositing spout secured to the beam beneath the discharge opening in the bottom of the receptacle, and means mounted upon the receptacle for regulating the discharge of material through said opening.

In testimony whereof I hereunto affix my signature in the presence of two witnesses.

WILLIAM T. McDONALD.

Witnesses:
J. C. McDonald,
J. A. McDonald.

---

Copies of this patent may be obtained for five cents each, by addressing the "Commissioner of Patents, Washington, D. C."